United States Patent
Richardson (10) Patent No.: US 11,691,149 B2
(45) Date of Patent: Jul. 4, 2023

(54) ROLLED FILM WITH STRUCTURES FOR FLUID SEPARATION

(71) Applicant: Imagine TF, LLC, Campbell, CA (US)

(72) Inventor: Brian Edward Richardson, Los Gatos, CA (US)

(*) Notice: Subject to any disclaimer, the term of this patent is extended or adjusted under 35 U.S.C. 154(b) by 313 days.

(21) Appl. No.: 17/005,431

(22) Filed: Aug. 28, 2020

(65) Prior Publication Data
US 2021/0060559 A1  Mar. 4, 2021

Related U.S. Application Data (60) Provisional application No. 62/922,875, filed on Sep. 3, 2019.

(51) Int. Cl.
*B01L 3/00* (2006.01)
*B01D 15/02* (2006.01)

(52) U.S. Cl.
CPC ........ *B01L 3/502746* (2013.01); *B01D 15/02* (2013.01)

(58) Field of Classification Search
CPC ...... B01D 15/02; B01D 25/24; B01L 3/50274
See application file for complete search history.

(56) References Cited

U.S. PATENT DOCUMENTS

2006/0016685 A1* 1/2006 Hawkins ........... B01D 65/00
                                                    204/632
2014/0265009 A1* 9/2014 Schaffitzel ......... B29C 43/226
                                                  264/171.13

FOREIGN PATENT DOCUMENTS

WO   WO8803431 A1 *  5/1988  ........... B01D 25/24

* cited by examiner

*Primary Examiner* — Benjamin L Lebron
(74) *Attorney, Agent, or Firm* — The Kline Law Firm; Keith Kline (57) ABSTRACT

Devices for the separation of components within a fluid are disclosed herein. The device includes a housing that contains a roll of film with spaced apart microstructures thereon to crate channels to direct fluid flow. The channels have functionalized surfaces to attract and retain desired components in the fluid so that those components can be separated from the fluid. The film roll is typically contained by an outer sleeve around its perimeter to contain the fluid therein. The device also includes a central hub on which the film roll is mounted.

14 Claims, 13 Drawing Sheets

ROLLED FILM WITH STRUCTURES FOR FLUID SEPARATION

CROSS REFERENCE TO RELATED APPLICATIONS

This application claims the priority benefit of U.S. Provisional Application No. 62/922,875, filed Sep. 3, 2019. The disclosure of that application is incorporated herein by reference.

FIELD OF THE DISCLOSURE

The present disclosure relates generally to fluidic architectures for separation of one or more components from a fluid with a thin polymer film rolled into a drum type configuration. The thin polymer film has micro or nano structures on at least one surface to create a path for fluid to flow axially along the roll of film.

SUMMARY

In various embodiments of the present disclosure, separation devices include a housing and a film roll that includes microstructures. The microstructures are spaced apart on the film to create channels for the flow of fluid in the axial direction through the film roll. The housing facilitates the supply of fluid to the inlet end of the film roll as well as the outflow of fluid from the film roll through an outlet to the outlet of the separation device. It should be noted that the fluid could be either gas or liquid.

The surfaces of some or all of the separation panels are formed from a material, either the base material or a coating, that interacts with the fluid flowing through the device. The interaction would generally be to attract one or more components within the fluid. By attracting the one or more components to a surface, the components can be easily removed from the fluid or reduced in quantity. This type of component removal is commonly used in water filtration to remove unwanted chemicals. Chromatography is another area where this concept is utilized. Drug process chromatography utilizes surface attraction to separate a specific component from a "soup" of many components. In most cases the separated component is the component of interest. The component is retrieved in a second process where a wash fluid is run though the device that eliminates the attraction of the component to the surface thereby releasing the component into the solution. Analytical chromatography adds an additional constraint to the separation device, that of timing. Analytical chromatography is used to separate a large number of components within a solution from one another over time. To maintain the timing of component removal, the flow through all areas needs to be consistent. This requires that the flow paths within the device maintain similar lengths and resistance.

BRIEF DESCRIPTION OF THE DRAWINGS

The accompanying drawings, wherein like reference numerals refer to identical or functionally similar elements throughout the separate views, together with the detailed description below, illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is directed to configurations of separation devices that are utilized to separate a particular component from a fluid—either gas or liquid, or solid particles that have fluidic characteristics. Separation panels deploy ribs to create walls and channels to direct fluids flowing though the separation device.

Figure 1:
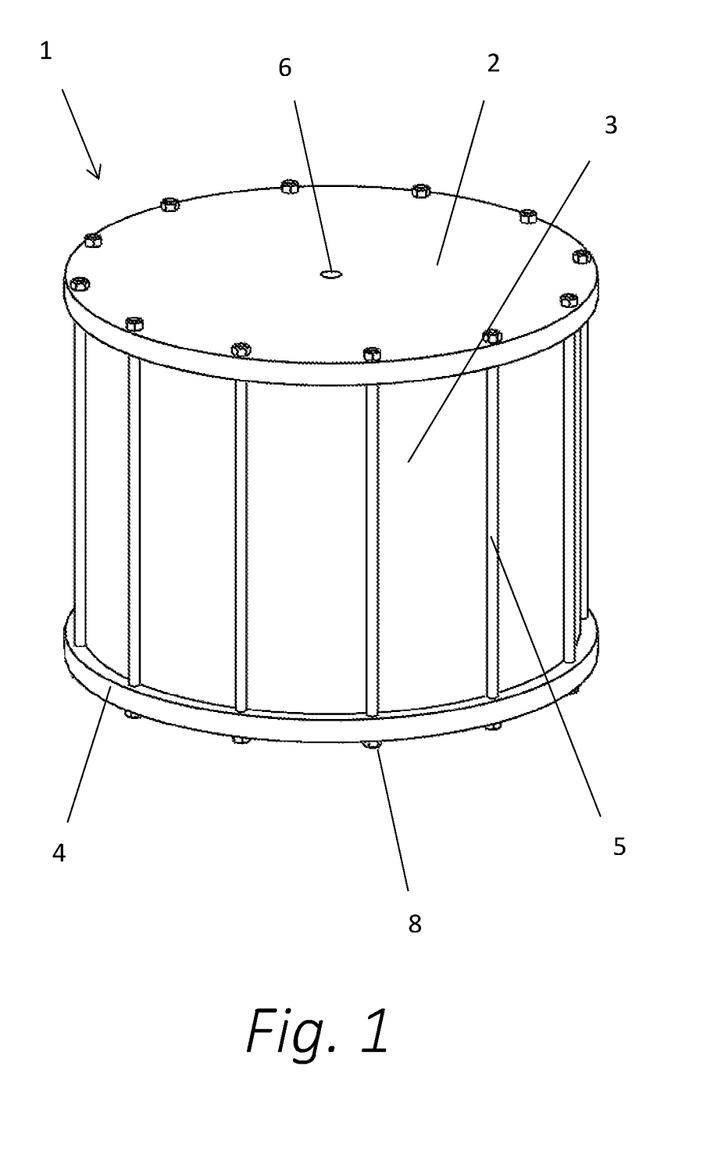
FIG. 1 is a perspective view of the separation device.

Referring first to FIG. 1, the separation device 1 is shown with a top cover 2 and a bottom cover 4 clamping an outer sleeve 3. A clamping force is provided by threaded shafts 5 and corresponding nuts 8. One skilled in the art of housing design could conceive of many other variations of housings that would securely hold in place the outer sleeve 3. The top cover 2 has an inlet port 6 and the bottom cover 4 has a corresponding outlet port (not shown). These ports direct fluids to and from the internal plenums inside the separation device 1. The housing may require gaskets or sealer at various junctions to ensure fluid within the devices exits at only the outlet port.

Figure 2:
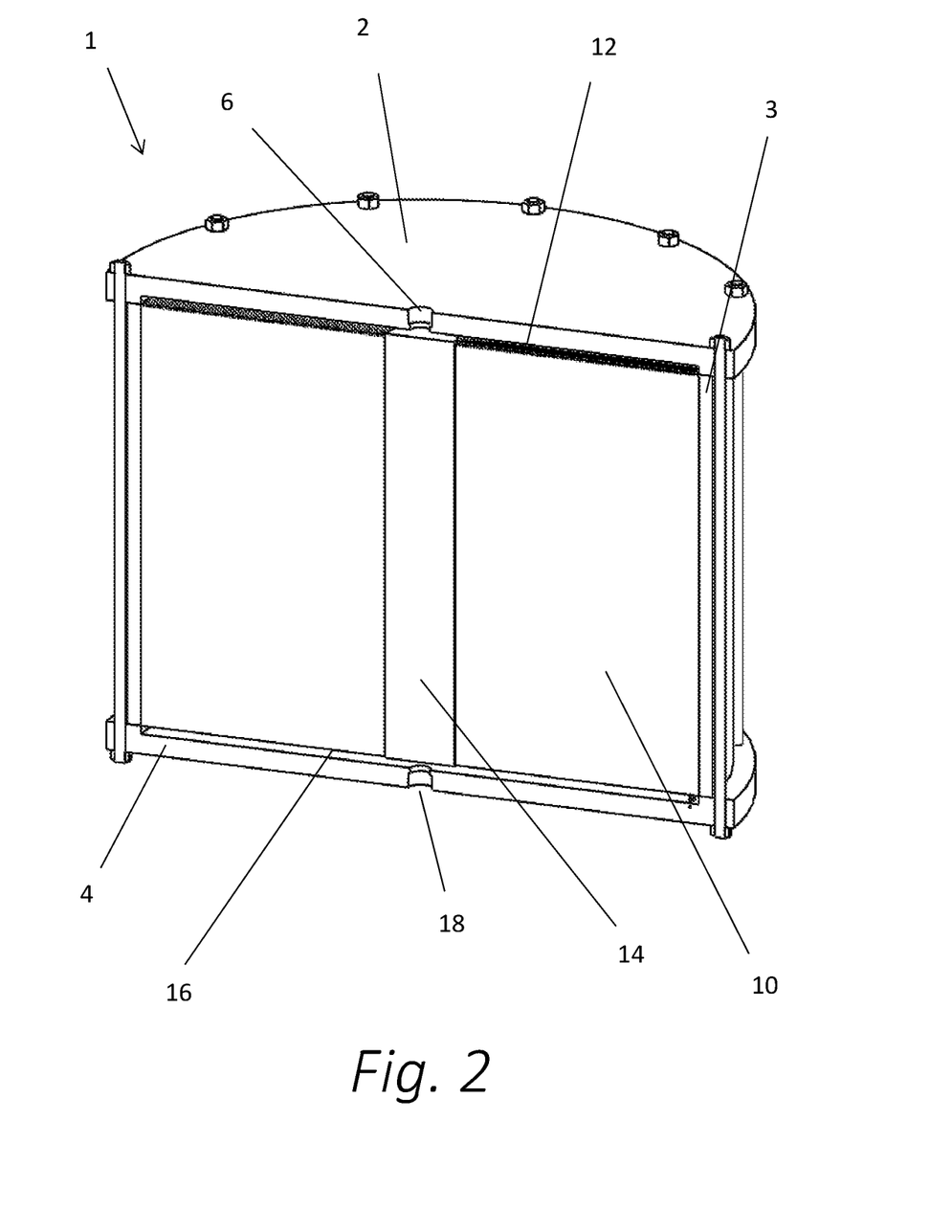
FIG. 2 is a sectional view of the separation device shown in FIG. 1.

FIG. 2 shows the interior of the separation device 1. The inlet port 6 in the top cover 2 feeds inlet plenum 12. The inlet plenum 12 distributes the fluid requiring separation to a film roll 10. The film roll 10 is a roll of film wound onto a hub 14. The outer diameter of the film roll 10 is built with a slight interference fit relative to the inside diameter of the outer sleeve 3. The fluid within the inlet plenum 12 distributes fluid to a top surface of the film roll 10 and a top side of the hub 14. The hub 14 is generally solid and therefore blocks fluid flow at its top surface.

The film roll 10 includes a large number of micron scale channels extending from the top of the film roll 10 to the bottom of the film roll 10. These channels allow for the flow of fluid from the inlet plenum 12 to the outlet plenum 16. The outlet plenum 16 directs the fluid exiting the film roll 10 to the outlet port 18, which is located directly under the bottom side of the hub 14. In summary, the fluid delivered to the inlet port 6 is delivered to and flows through the film roll 10 and then out the outlet port 18 via the outlet plenum 16.

Figure 3:
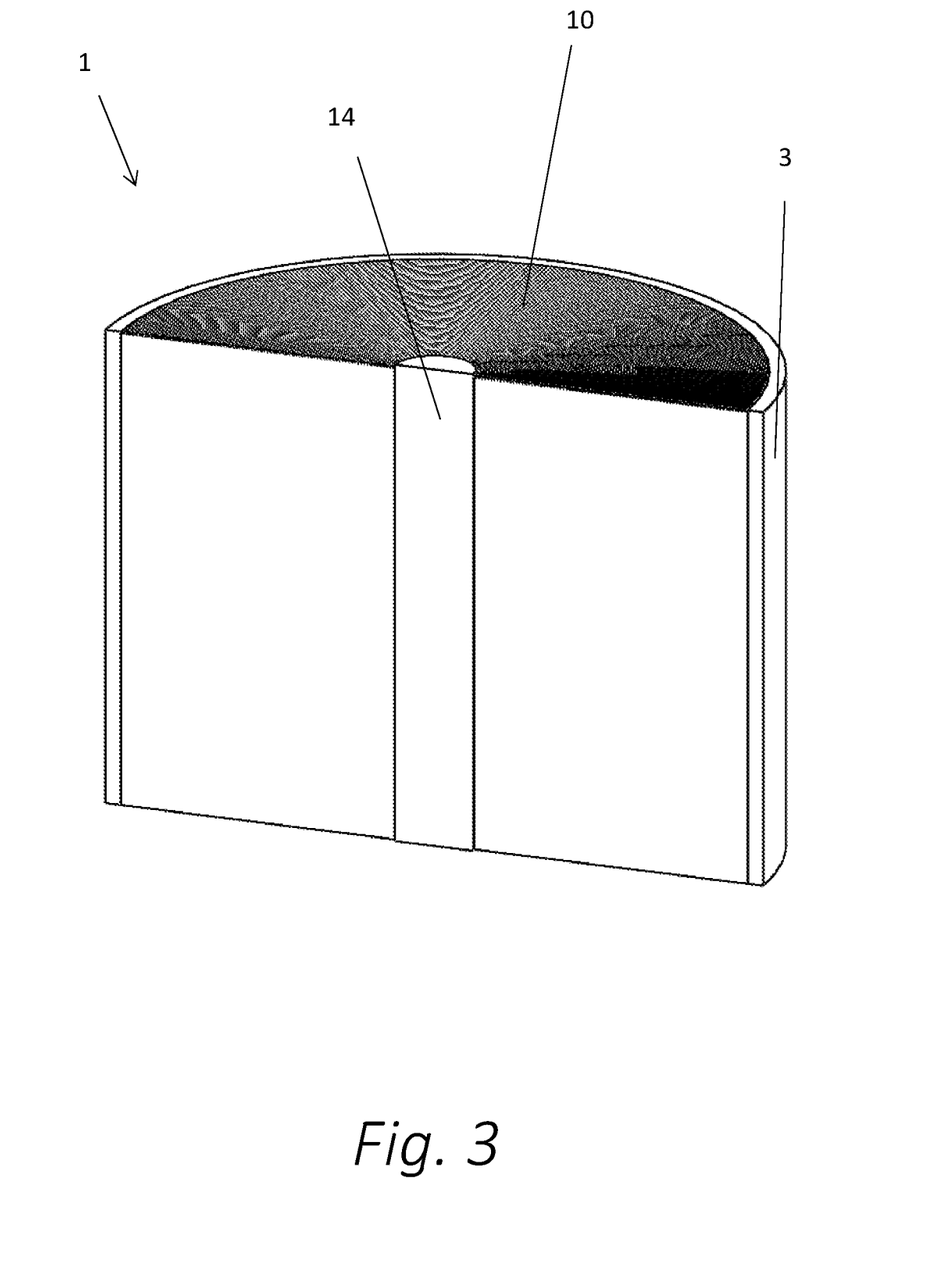
FIG. 3 is from the same viewpoint as FIG. 2 but with the top cover, the bottom cover, and hardware removed.
Figure 4:
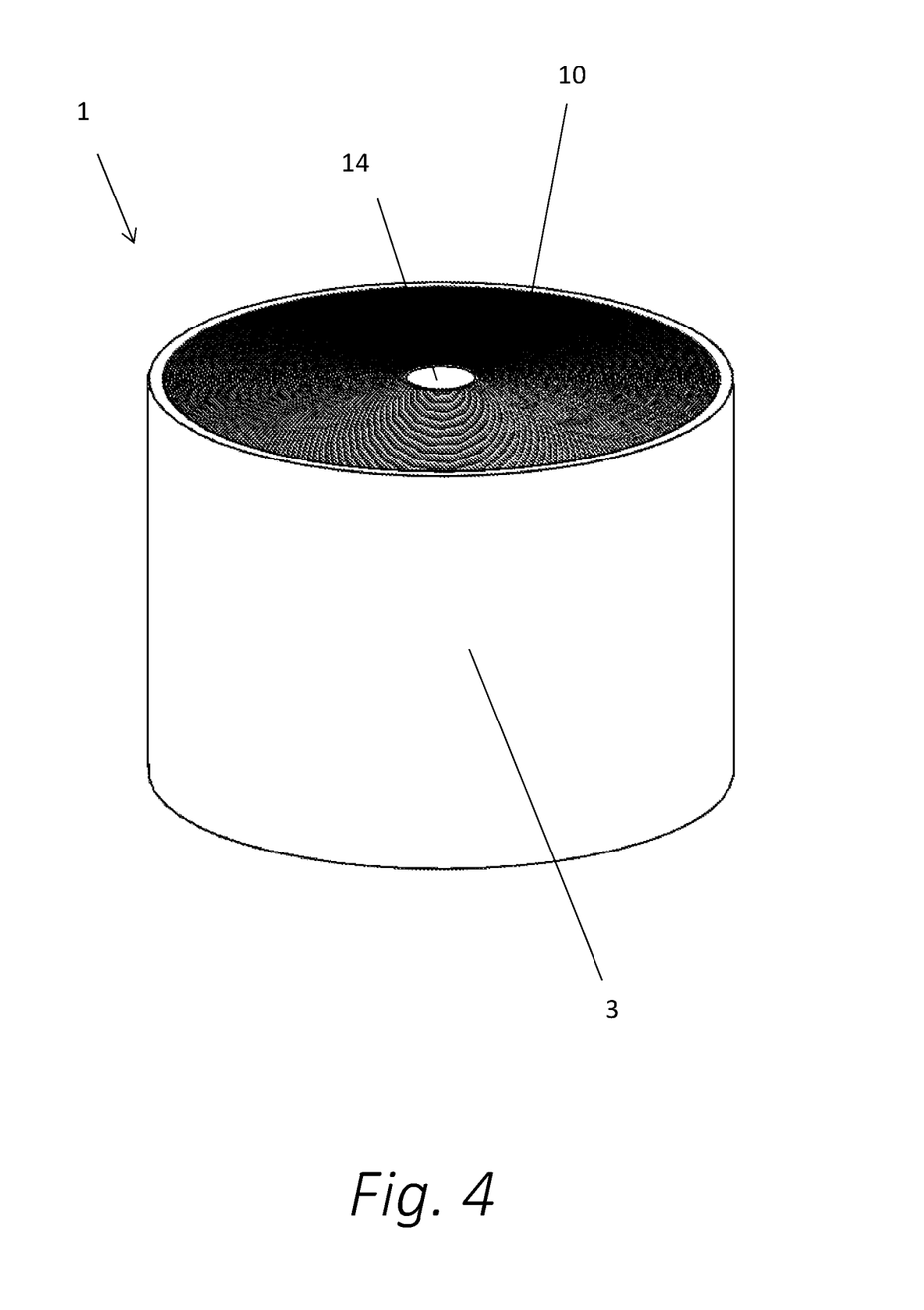
FIG. 4 is from the same viewpoint as FIG. 1 but with the top cover, the bottom cover, and hardware removed.

FIG. 3 is a sectional view of the separation device 1 with the top cover 2, the bottom cover 4, the threaded shafts 5, and the nuts 8 removed to more clearly show the film roll 10, the hub 14, and the outer sleeve 3. FIG. 4 shows these same components in a non-sectioned view.

Figure 5:
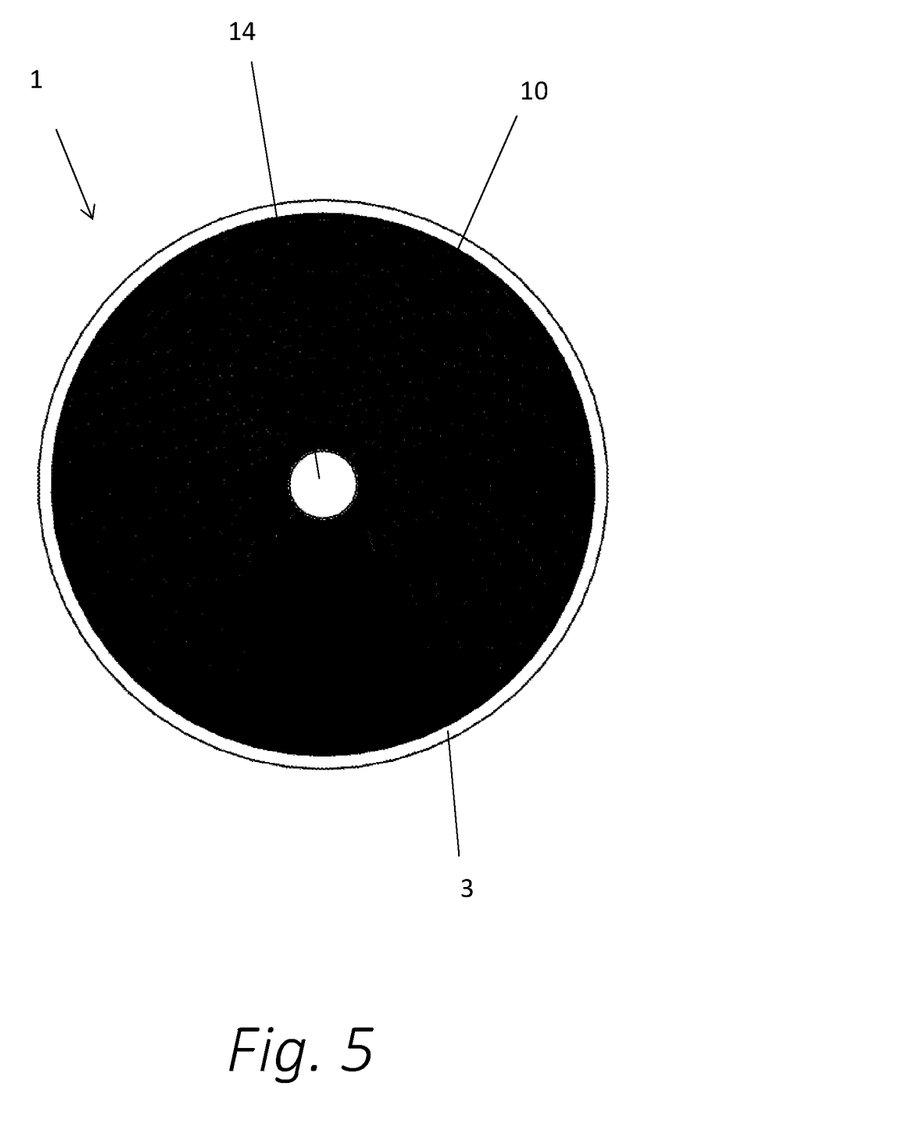
FIG. 5 is a top view of the device as illustrated in FIG. 4.
Figure 6:
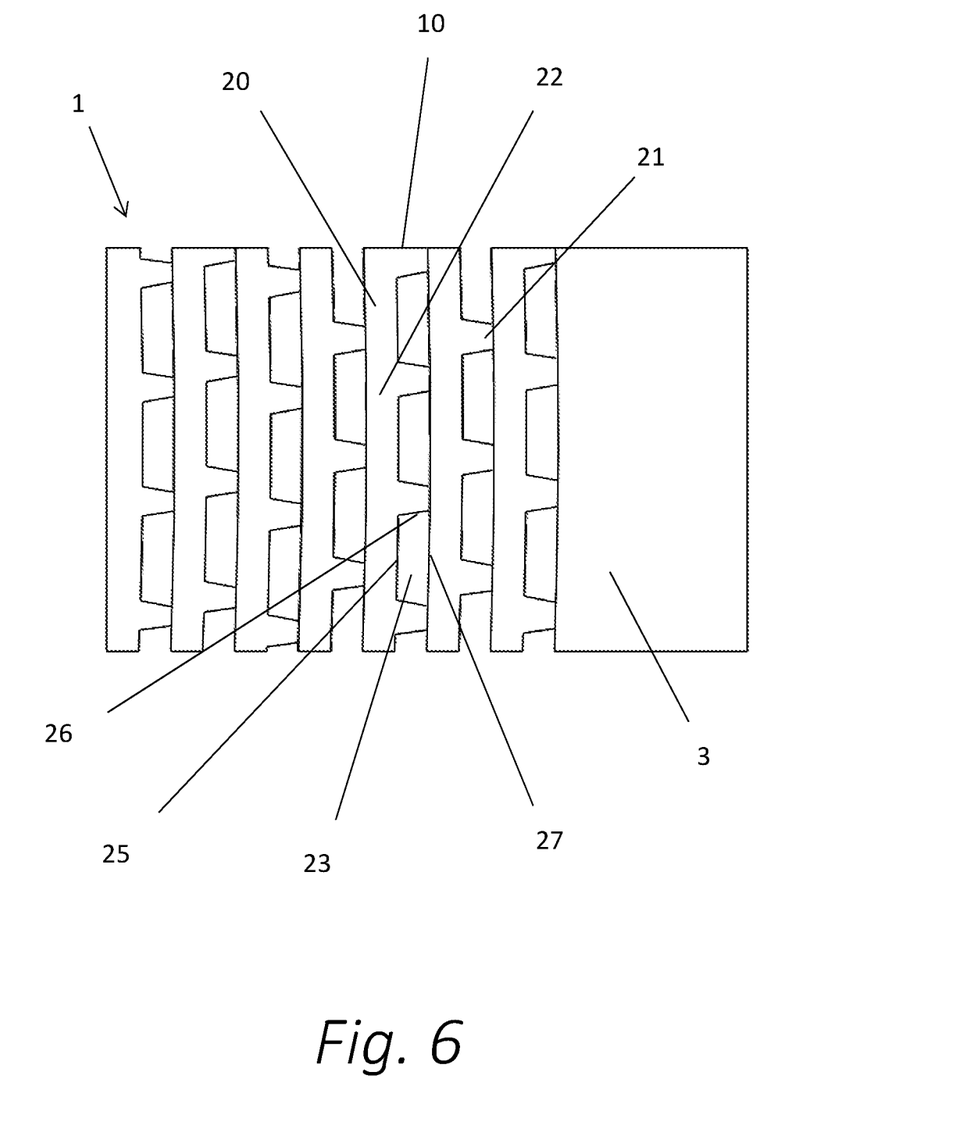
FIG. 6 is a closeup detail broken top view of the device shown in FIG. 5.

FIG. 5 is a top view of the interior components of the separation device 1, and FIG. 6 is a detailed section of the right side of the components shown in FIG. 5. In FIG. 6, the micron scale features of the device can be seen. The film roll 10 fits within the inside wall of the outer sleeve 3. The film roll 10 includes a micro structured film 20. The micro structured film 20 is wound around the hub 14 to create the film roll 10. The micro structured film 20 includes a film substrate 22 and ribs 21. The ribs 21 are typically anywhere from 1 micron to 100 microns tall. The ribs 21 are generally constructed so as to be as wide as they are tall. The ribs 21 are typically spaced along the surface of the film substrate 22 at intervals of approximately from 1× to 5× their width. The rib channel walls 26, along with first 25 and second 27 surfaces of the substrate walls, define the fluid flow channels 23.

Figure 7:
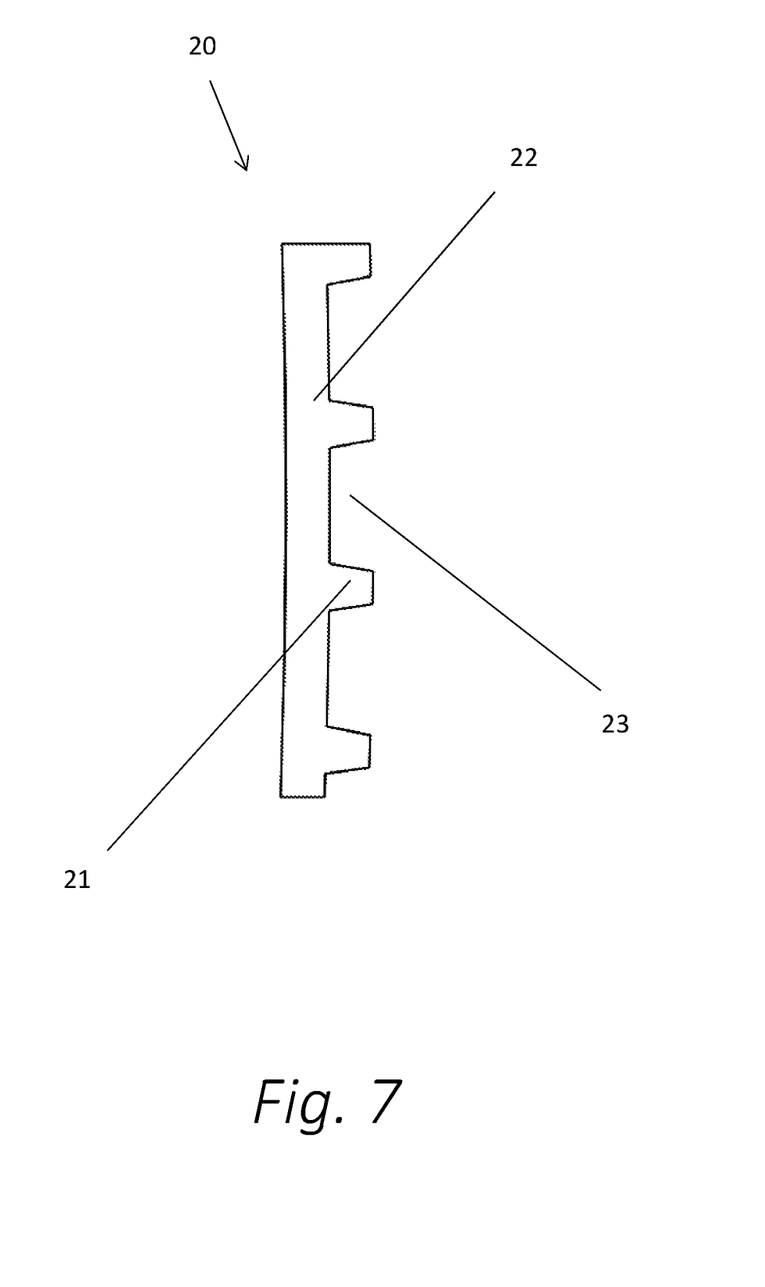
FIG. 7 depicts a single layer of the film.
Figure 8:
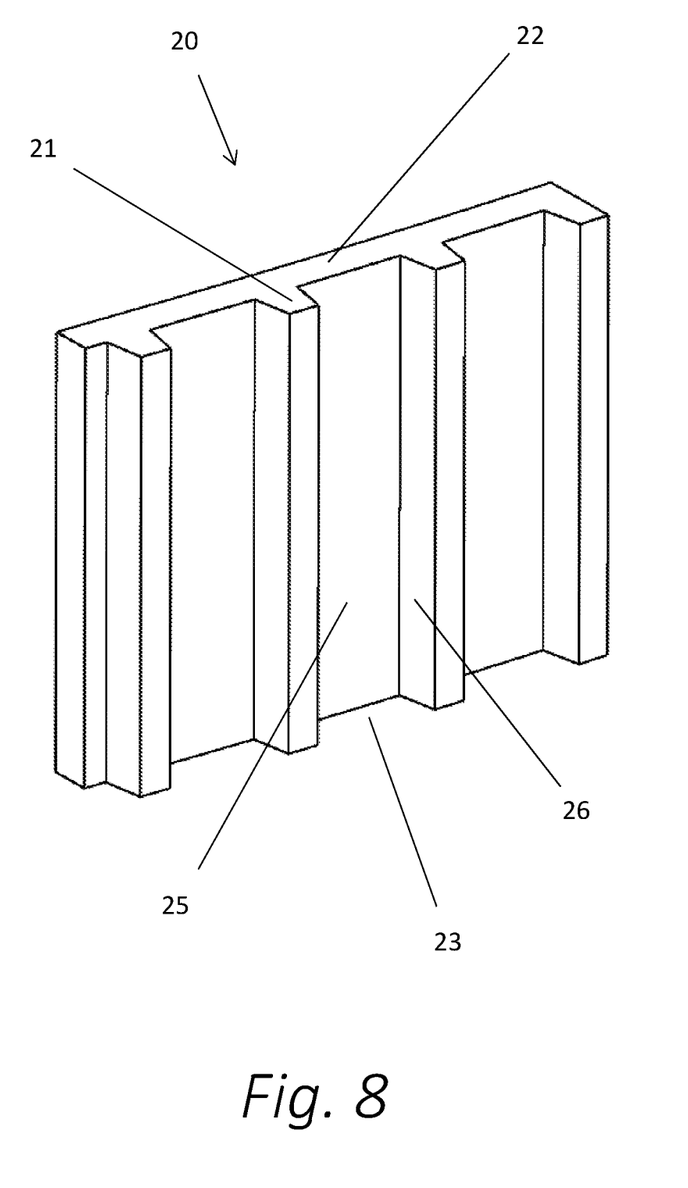
FIG. 8 is a perspective view of the film layer shown in FIG. 7.

FIG. 7 is a side view of a single section of the micro structured film 20. FIG. 8 shows the same single section from a perspective view.

As described above, the ribs 21 on the film substrate 22 form fluid flow channels 23. The surfaces of the ribs 21 forming the channels 23 are made from a material that attracts and retains, or alternatively, retards the flow of components of compounds within the fluid flow channels 23. The characteristics of the surfaces of the ribs 23 are a function of the material used to fabricate the micro structured film 20. Alternatively, a coating may be applied to the surface of the micro structured film 20 to provide the desired characteristics. One skilled in the art of separation devices could easily envision suitable surface materials to accomplish the separation of a compound or compounds from the fluid.

If desired by the user of the separation device 1, different surface properties can be applied along the length of the channels 23. For example, a first surface along the top half of the channel walls 23 could be a positively charged surface, and a second surface along the bottom half of the channel walls 23 could be a negatively charged surface.

The amount of surface area of the channel walls 23 defines the capacity of the separation device 1 to retain compounds. To increase the surface area, the ribs 21 may be formed with a porous material, or the ribs 21 can be coated with a porous material. Again, one skilled in the art of separation devices could devise a specific porosity along with a material or coating to perform the separation task required in a given application.

With a separation process it is often desired to remove and recover a compound that has been separated. A second or even a third fluid is deployed to remove the remaining compound or compounds. Also, unwanted compounds may want to be washed from the separation device so it can be reused. Flushing the system with different types of fluids could be used for this task.

Figure 9:
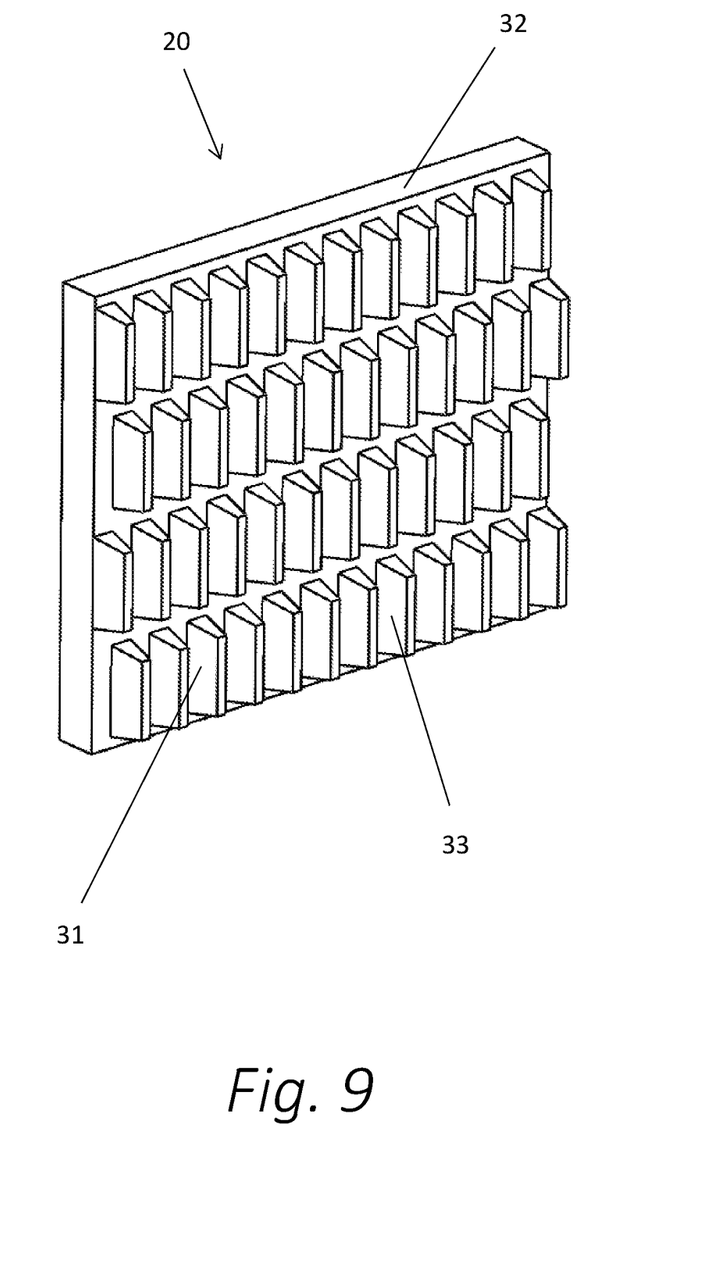
FIG. 9 is the same perspective as FIG. 8 showing an alternate configuration of the film layer.
Figure 10:
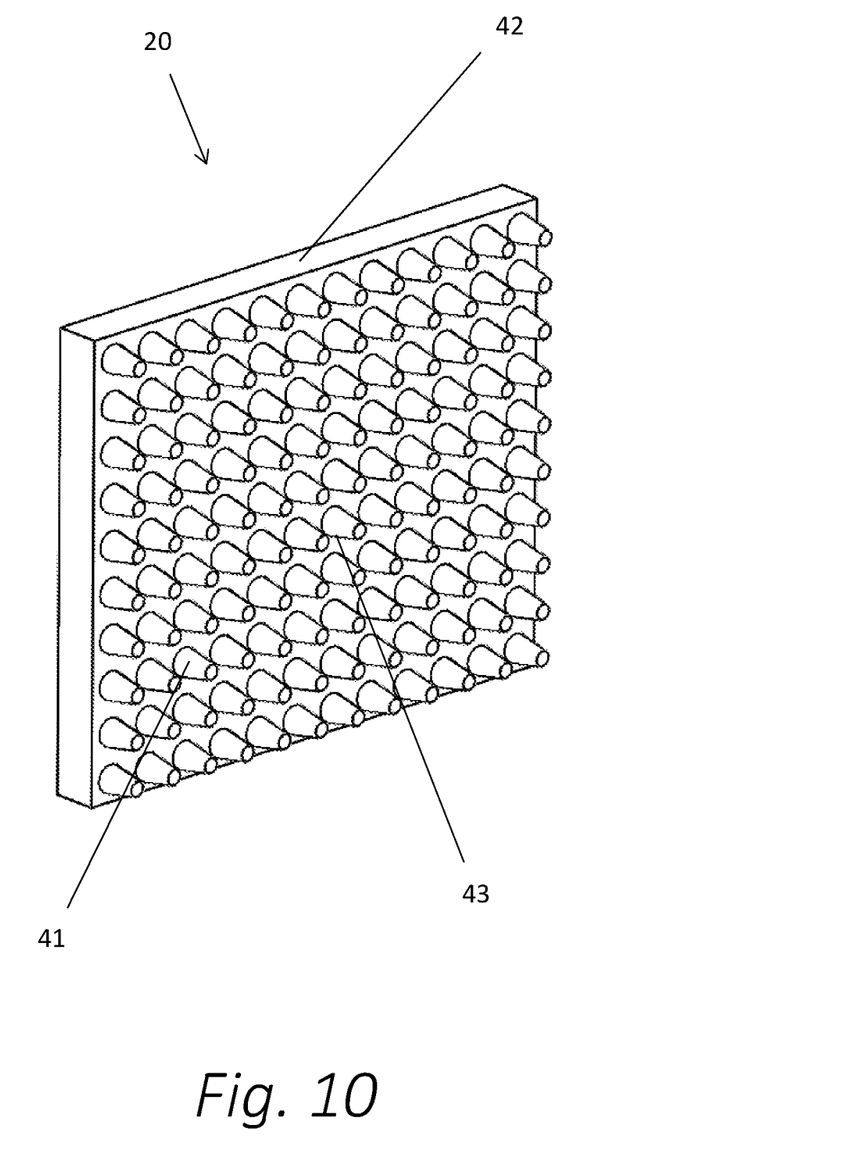
FIG. 10 is also the same perspective as FIG. 8 and shows another alternate configuration of the film layer.

Referring now to FIG. 9 FIG. 10, two alternate configurations for the ribs on a micro structured film 20 are shown. The configuration of the ribs 31 is selected as a function of the desired configuration of the resultant channels 33, and the fluidic surface area of the ribs. One skilled in the art of fluidic channels could devise many other shapes and configurations of the rib structures. FIG. 9 shows a configuration with the ribs 31 broken and staggered. FIG. 10 shows a configuration on a film substrate 42 wherein the ribs are conical posts 41 positioned to form channels 43.

Figure 11:
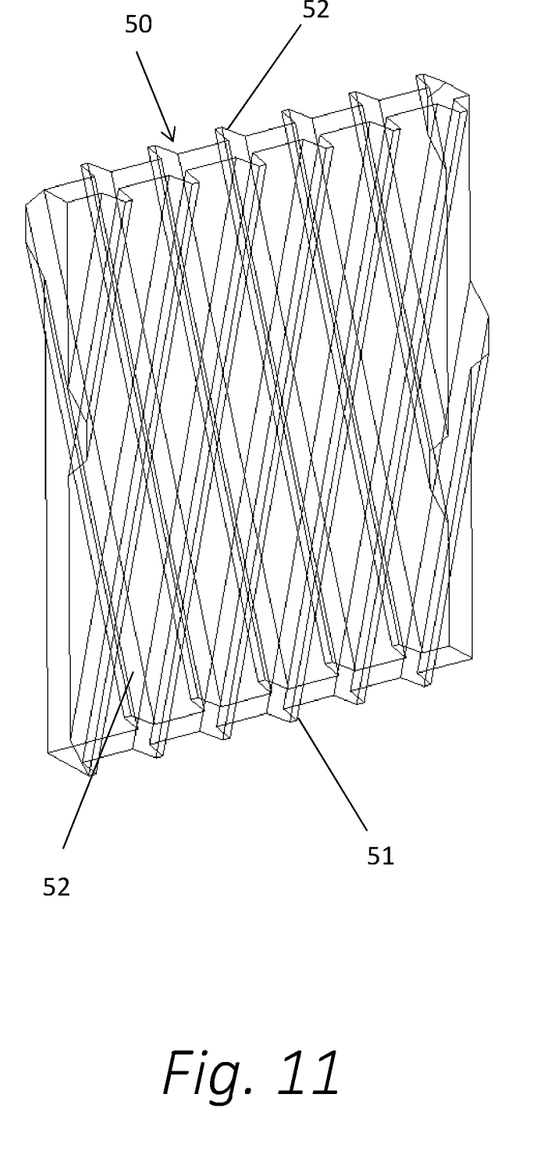
FIG. 11 is the same perspective as FIG. 8 and shows still another configuration for the film layer utilizing a double-sided film layer.
Figure 12:
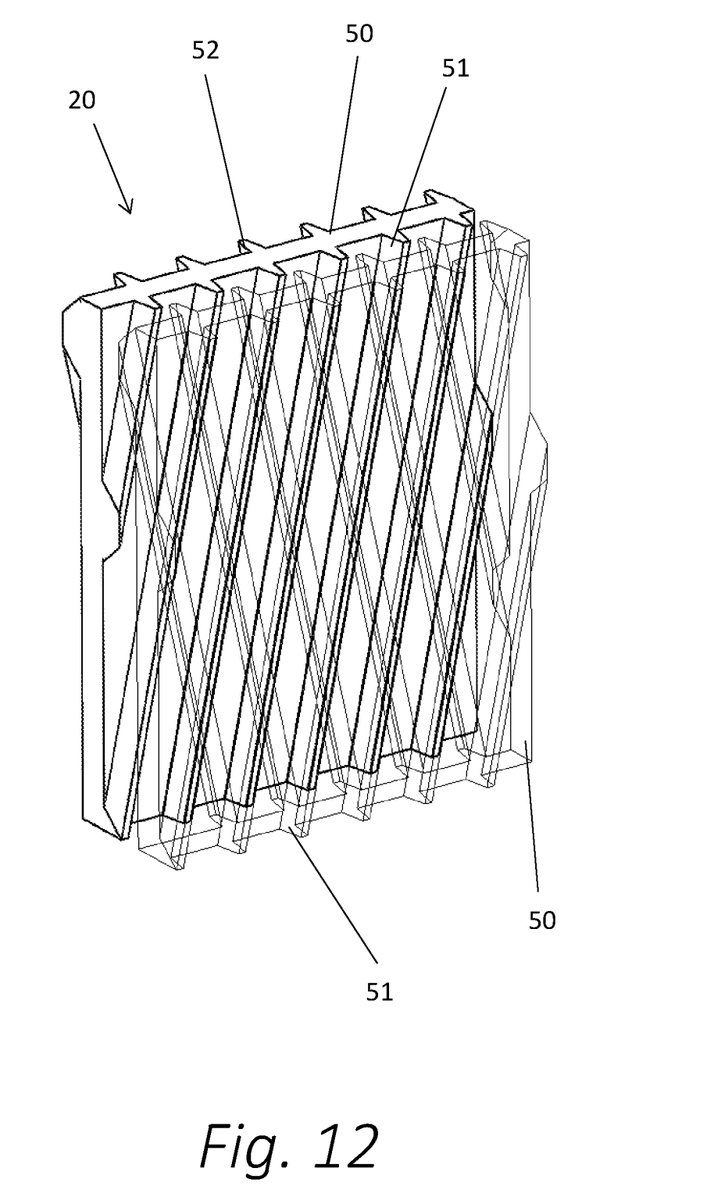
FIG. 12 is another view of the double-sided film layer shown in the same perspective as FIG. 11.

FIG. 11 shows a double-sided film 50 configuration which utilizes solid frontside ribs 51 and solid backside ribs 52 to form the desired channel conformations. In various embodiments, the backside ribs 52 are angled in a direction opposite to the angle of the frontside ribs 51. In this configuration, when the double-sided film 50 is assembled into a film roll the top surface of the frontside ribs 51 contact the top surface of the backside ribs 52. The angular relationship of the frontside 51 and backside 52 ribs allows for the fluid flow of neighboring channels to mix. In some applications of the separation device this is desirable. FIG. 12 is a view of two layers of the double-sided film 50 with the layer in the foreground illustrated as transparent so that the relationship of the two sides of the film 50 can be more readily seen.

Figure 13:
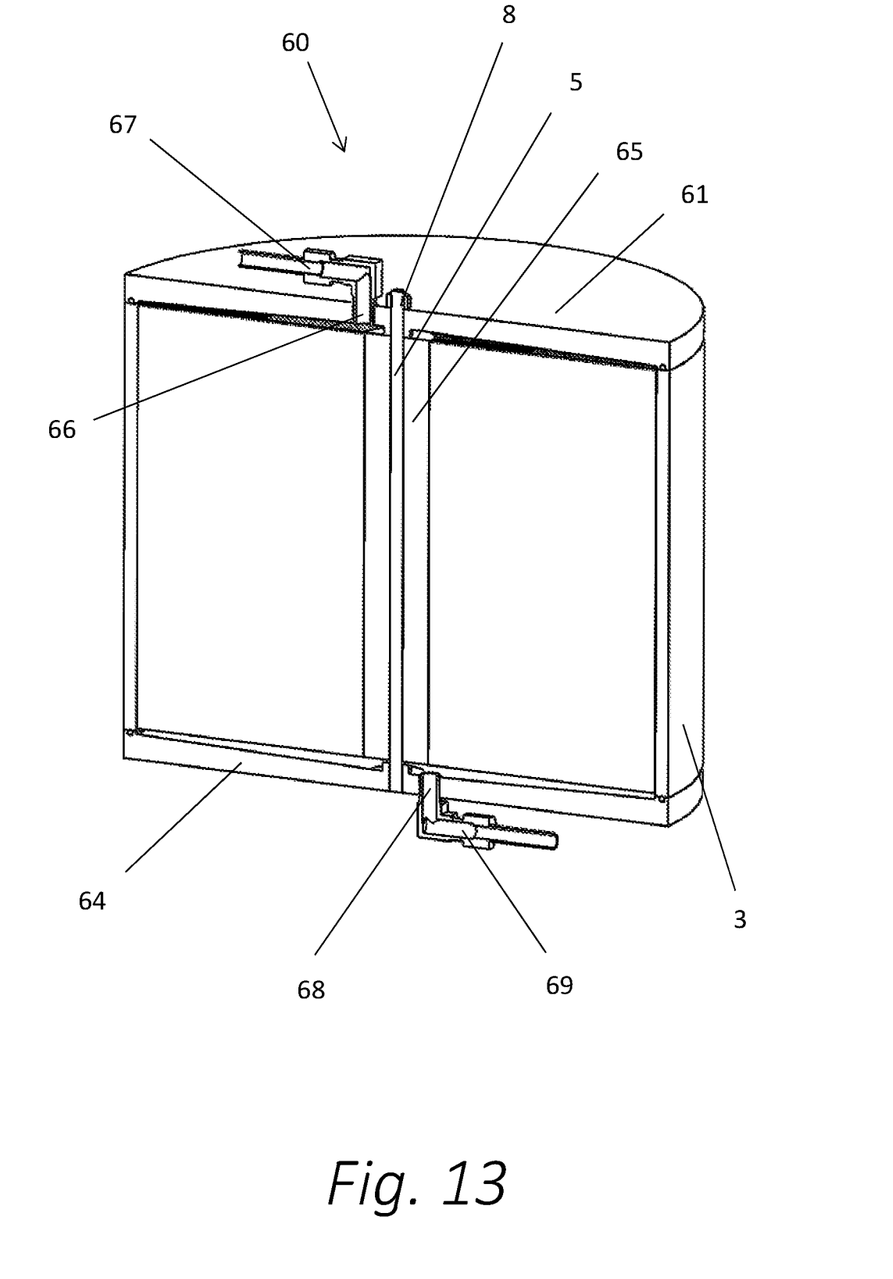
FIG. 13 is a sectional view of another configuration of the separation device.

FIG. 13 illustrates another configuration of a separation device 60. In this configuration, a housing including a top cover 61 and a bottom cover 64 secure the outer sleeve 3 in place by means of a single shaft 5 and nut 8. A hub 64 includes a center hole that receives the shaft 5. The device 60 includes a hardware inlet 67 leading into an inlet port 66 which supplies fluid to the interior of the separation device 60. Fluid exits the device 60 via an outlet port 68 in communication with a hardware outlet 69.

From an engineering standpoint, it should be noted that the size of the channels, both their widths and heights, need to be consistent over the entire film roll. If they are not consistent, the fluid flows faster through the larger areas of the channels and slower through the smaller areas. In many separation processes, this is an undesirable characteristic. To ensure that the channels are accurately and consistently sized, semiconductor or super precision processing equipment is required to construct tooling for the fabrication of the micro structured films utilized in the separation devices.

The technology disclosed herein addresses improved configurations for separation devices. The improvements disclosed are independent of the actual surface material used for the separation. There is a myriad of choices that would suffice as the material from which to separation panels and coatings on their surfaces. Further, the type of material used to create the separation panels is not limited to plastic or semiconductor material. Glass or metals could be deployed. It should be self-evident that one skilled in the art of separation materials could engineer a specific separation material to be used in a given application.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In the foregoing description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A fluid separation device, comprising:
   a housing comprising an inlet port, an inlet plenum, an outlet plenum, and an outlet port; and
   at least one film roll; wherein multiple layers of the film roll are spaced apart by axially and radially separated structures on a surface of the film roll to create multiple axial and radial fluid flow paths between layers of the film roll, rows of the structures being offset so that axial flow paths are interrupted, the fluid flow paths facilitating separation of components in a fluid.

2. The separation device of claim 1, wherein the housing includes an outer sleeve held in place by a top cover and a bottom cover.

3. The separation device of claim 1, wherein the structures are elongated ribs.

4. The separation device of claim 1, wherein the structures are rib segments.

5. The separation device of claim 1, wherein the structures are at least partially formed from a porous material.

6. The separation device of claim 1, wherein the structures are covered at least partially with a porous material.

7. The separation device of claim 1, wherein the structures are posts.

8. The separation device of claim 7, wherein the posts have a circular cross section.

9. The separation device of claim 7, wherein the posts have a polygonal cross section.

10. The separation device of claim 1, wherein the structures are situated on two surfaces of inner portions of the film roll.

11. The separation device of claim 1, wherein the film roll is mounted on a central hub.

12. The separation device of claim 1, wherein the film roll is contained within an outer sleeve.

13. The separation device of claim 1, wherein surfaces of the structures are formed from material chosen to attract and retain specific components in the fluid.

14. The separation device of claim 1, wherein the film roll is formed on a plastic film substrate.

* * * * *